US008289936B2

(12) United States Patent
Wang et al.

(10) Patent No.: US 8,289,936 B2
(45) Date of Patent: Oct. 16, 2012

(54) SEAMLESS PUBLIC WIRELESS LOCAL AREA NETWORK USER AUTHENTICATION

(75) Inventors: Charles Chuanming Wang, Jamison, PA (US); Sachin Satish Mody, Lawrenceville, NJ (US); Junbiao Zhang, Bridgewater, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 2282 days.

(21) Appl. No.: 10/514,311

(22) PCT Filed: May 13, 2003

(86) PCT No.: PCT/US03/15026
§ 371 (c)(1),
(2), (4) Date: Nov. 12, 2004

(87) PCT Pub. No.: WO03/096554
PCT Pub. Date: Nov. 20, 2003

(65) Prior Publication Data
US 2005/0243778 A1 Nov. 3, 2005

Related U.S. Application Data

(60) Provisional application No. 60/378,029, filed on May 13, 2002.

(51) Int. Cl.
*H04W 4/00* (2009.01)
*H04L 12/66* (2006.01)
*H04L 12/00* (2006.01)
*H04L 9/32* (2006.01)
*G06F 15/17* (2006.01)

(52) U.S. Cl. ........ 370/338; 370/352; 370/328; 709/227; 709/238; 713/155; 713/168

(58) Field of Classification Search .................. 370/338, 370/310, 328, 329, 331, 352; 455/435.1–435.3; 713/155, 168–172; 709/227–229, 238
See application file for complete search history.

(56) References Cited

U.S. PATENT DOCUMENTS
6,233,616 B1 * 5/2001 Reid .............................. 709/225
(Continued)

FOREIGN PATENT DOCUMENTS
DE 19812924 9/1999
(Continued)

OTHER PUBLICATIONS
"Towards Ubiquitous Wireless Broadband", Boingo WI-FI Industry, White Paper, published by Boingo Wireless, Mar. 20, 2003.
(Continued)

*Primary Examiner* — Matthew Sams
(74) *Attorney, Agent, or Firm* — Robert D. Shedd; Robert B. Levy

(57) ABSTRACT

A public wireless LAN permits receipt of non-authentication traffic, such as access information requests, from a mobile wireless communications device prior to device authentication by partially opening a controlled port within an access point. The wireless LAN re-directs such non-authentication traffic received at the AP from the mobile wireless communications to a local web server. The local web server provides reply to the mobile wireless communications device, enabling a determination by the device whether or not to request access. The device seeks access by way of an access request received at the AP. In response, the AP re-directs the access request through an uncontrolled port in the AP to an access server that authenticates device. Upon successful device authentication, the AP fully opens its controlled port to permit the exchange of traffic through that port with the mobile wireless communications device.

7 Claims, 2 Drawing Sheets

U.S. PATENT DOCUMENTS

| | | | |
|---|---|---|---|
| 6,400,946 B1 * | 6/2002 | Vazvan et al. | 455/432.1 |
| 7,065,360 B2 * | 6/2006 | Yahagi | 455/437 |
| 7,171,460 B2 * | 1/2007 | Kalavade et al. | 709/223 |
| 2002/0041689 A1 | 4/2002 | Morimoto | |
| 2002/0174335 A1 * | 11/2002 | Zhang et al. | 713/168 |
| 2003/0084287 A1 * | 5/2003 | Wang et al. | 713/168 |
| 2003/0168713 A1 * | 9/2003 | Narazaki et al. | 257/513 |
| 2003/0169713 A1 | 9/2003 | Luo | |

FOREIGN PATENT DOCUMENTS

| | | |
|---|---|---|
| EP | 1161031 | 12/2001 |
| EP | 1178644 | 2/2002 |
| EP | 1193951 | 4/2002 |
| EP | 1330073 | 7/2003 |
| JP | 2002-118562 | 4/2002 |
| WO | WO03/095165 | 11/2003 |
| WO | WO03/096165 | 11/2003 |

OTHER PUBLICATIONS

"Wi-Fi Security for the Enterprise", John Sidline et al., published by iPAss, Inc., Aug. 12, 2002.

Search Report Dated October 13, 2003.

G. Takada, "Technology to Watch in 2002: All About Wireless LAN", Nikkei Network, pp. 59-79, Jan. 2002, vol. 21, Nikkei BP, Dec. 22, 2001.

* cited by examiner

SEAMLESS PUBLIC WIRELESS LOCAL AREA NETWORK USER AUTHENTICATION

CROSS-REFERENCE TO RELATED APPLICATIONS

This application claims the benefit, under 35 U.S.C. §365 of International Application PCT/US2003/015026, filed May 13, 2003, which was published in accordance with PCT Article 21(2) on Nov. 20, 2003 in English and which claims the benefit of U.S. provisional patent application No. 60/378,029, filed May 13, 2002, which is incorporated by reference herein.

TECHNICAL FIELD

This invention relates to a technique for authenticating a mobile wireless communications device in a public wireless Local Area Network (LAN).

BACKGROUND ART

Advances in the field of wireless LAN technology have resulted in the emergence of publicly accessible wireless LANs (e.g., "hot spots") at rest stops, cafes, libraries and similar public facilities. Presently, public wireless LANs offer mobile wireless communications device users access to a private data network, such as a Corporate Intranet, or a public data network such as the Internet. The relatively low cost to implement and operate a public wireless LAN, as well as the available high bandwidth (usually in excess of 10 Megabits/second) makes the public wireless LAN an ideal access mechanism through which users can exchange packets with an external entity.

When a user travels into a public wireless LAN coverage area, the public wireless LAN first authenticates and authorizes the user prior to granting network access. After authentication, the public wireless LAN Access Point (AP) opens a secure data channel to the mobile wireless communications device to protect the privacy of data exchanged with the device. Presently, many manufacturers of wireless LAN equipment have adopted the IEEE 802.1x protocol for deployed equipment. Hence, the predominant authentication mechanism for wireless LANs utilizes this standard. Unfortunately, the IEEE 802.1x protocol was a safe authentication procedure, but such mechanisms do not permit setting of a Wired Equivalent Privacy (WEP) encryption key in the Web browser. Therefore, data transmitted over wireless LAN after authentication remains unprotected.

Thus, there is need for an authentication process for use in a public wireless LAN environment that permits authentication in accordance with the IEEE 802.1x protocol, thus protecting the privacy of exchanged data, while affording customized interaction mechanisms.

BRIEF SUMMARY OF THE INVENTION

Briefly, in accordance with a preferred embodiment of the present principles, there is provided a method for authenticating the user of a mobile wireless communications device in a public wireless LAN. The method commences upon receipt of a request received from a mobile wireless communications device for non-authentication information, which can include access information, such as the cost of access. In response to such an information request, a controlled port in the public wireless LAN is partially opened to enable transmission of non-authentication (e.g., access) information request through the LAN to a first server that replies with the requested information. Assuming the user of the mobile wireless communications device finds the access terms specified in the reply from the first server acceptable, the user then sends an access request to an authentication server with an authenticating credential. In response to the access request, the authentication server authenticates the user and notifies the public wireless LAN to allow the use of wireless LAN services. Upon successful authentication, the public wireless LAN fully opens the controlled port to permit the exchange of data with the mobile wireless communications device through the controlled port.

DETAILED DESCRIPTION

Figure 1:
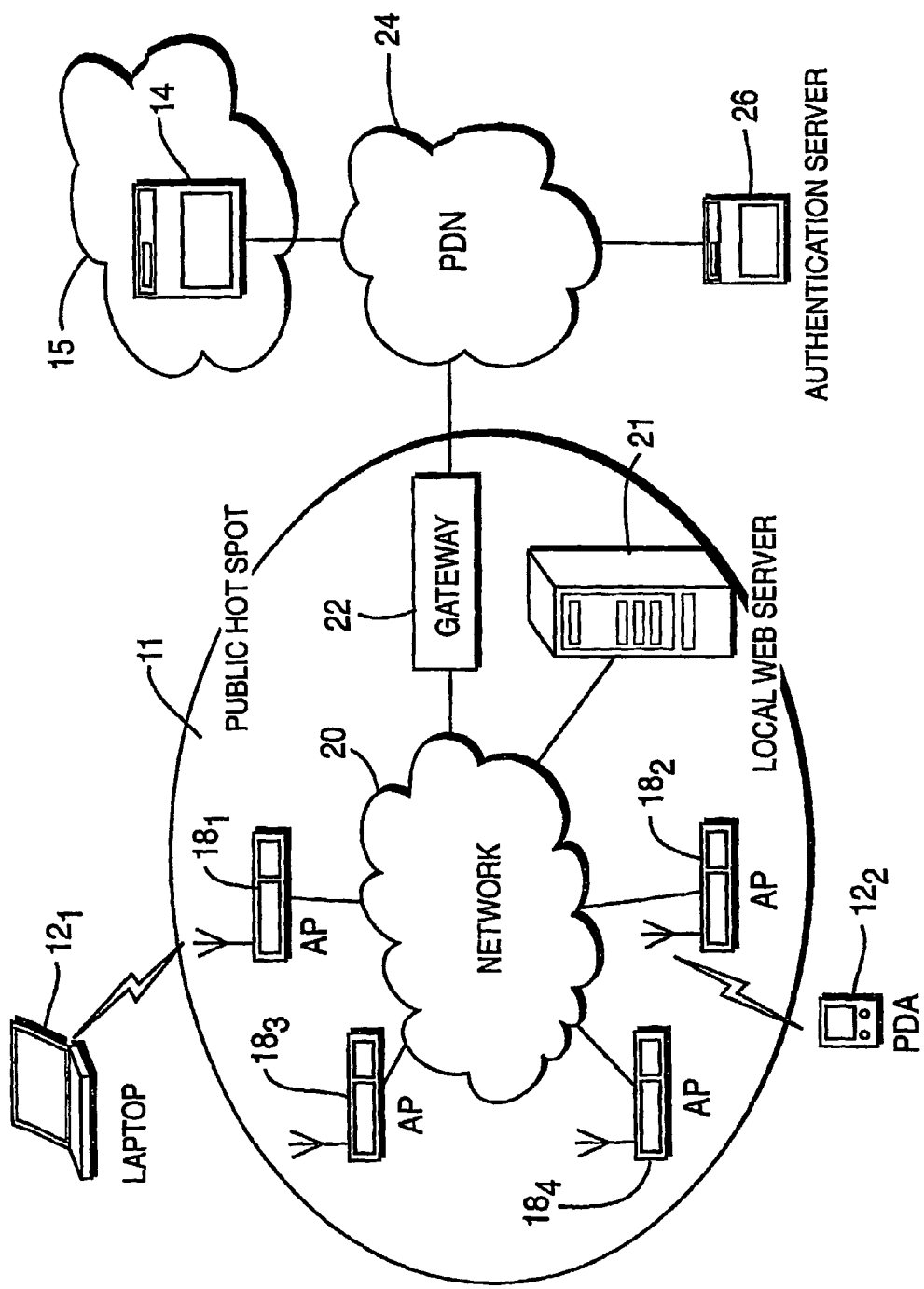
FIG. 1 depicts a block schematic diagram of a communications system for practicing the method of the present principles for authenticating the user of a mobile wireless communications device.

FIG. 1 depicts a block schematic diagram of a communications network 10 that includes an access arrangement 11 for enabling at least one mobile communication device, and preferably a plurality of mobile communication devices (e.g., mobile communication devices $12_1$, and $12_2$,) to securely access an external data source 14, which can take the form of a server within a network 15, such as a public data network (e.g., the Internet), or a private data network (e.g., a corporate intranet). In a preferred embodiment, the mobile communication device $12_1$ comprises a lap top computer that includes a wireless modem or wireless network access card, whereas the mobile communication device $12_2$ comprises a Personal Data Assistant. The access arrangement 11 can also serve other types of mobile wireless communications devices (not shown).

The access arrangement 11 of FIG. 1 includes at least one, and preferably, a plurality of access points (APs), best exemplified by APs $18_1$-$18_4$, via which the mobile wireless communication devices $12_1$ and $12_2$ can access a public wireless Local Area Network (LAN) 20. Although shown separately, the APs $18_1$-$18_4$ comprise part of the public wireless LAN 20. In the illustrated embodiment, each AP, such as AP $18_1$, includes a wireless transceiver (not shown) for exchanging radio frequency signals with a radio transceiver (not shown) within each mobile wireless communication device. To this end, each of the APs $18_1$-$18_4$ employs at least one well-known wireless data exchange protocol, such as the IEEE 802.1x protocol.

The access arrangement 11 also includes a server 21, in the form of a local web server that stores non-authentication information. Such non-authentication information can include access information, such as access terms and conditions, including the cost to the user. The local web server 21 enables a device user to obtain such non-authentication information without the need to establish an actual communications session with the public wireless LAN 20 and thus undergo authentication. Although shown separately, the local web server 21 could reside within the public wireless LAN 20.

A gateway 22 provides a communication path between the public wireless LAN 20 and a packet data network (PDN) 24 that provides a link to the network 15. The PDN 24 thus permits communications between each mobile wireless communications device and the data source 14. The PDN 24 also links the gateway 22 to an authentication server 26. In practice, the authentication server 26 takes the form of a database containing information about potential users to enable authentication of those seeking access to the wireless LAN 20. Rather than exist as a separate stand-alone entity, the authentication server 26 could reside within the public wireless LAN 20. Further, the PDN 24 provides a link between the public wireless LAN 20 and a billing agent (not shown) to facilitate billing device user for accessing the public wireless LAN. As with the authentication server 24, the functionality of the billing agent could reside within the public wireless LAN 20.

In advance of actually establishing an actual authenticated communications session with the public wireless LAN 20, a device user might wish to obtain certain non-authentication information, such as the terms and conditions of access, as well as the cost. Heretofore, the device user could not obtain such non-authentication information from a public wireless LAN whose access points (APs) employ the IEEE 802.1x protocol without establishing an authenticated communications session. The access arrangement 11 of the present principles overcomes this disadvantage by enabling a limited connection with the public wireless LAN 20 to obtain non-authentication information, including access information, prior to actually establishing an authenticated communications session.

Figure 2:
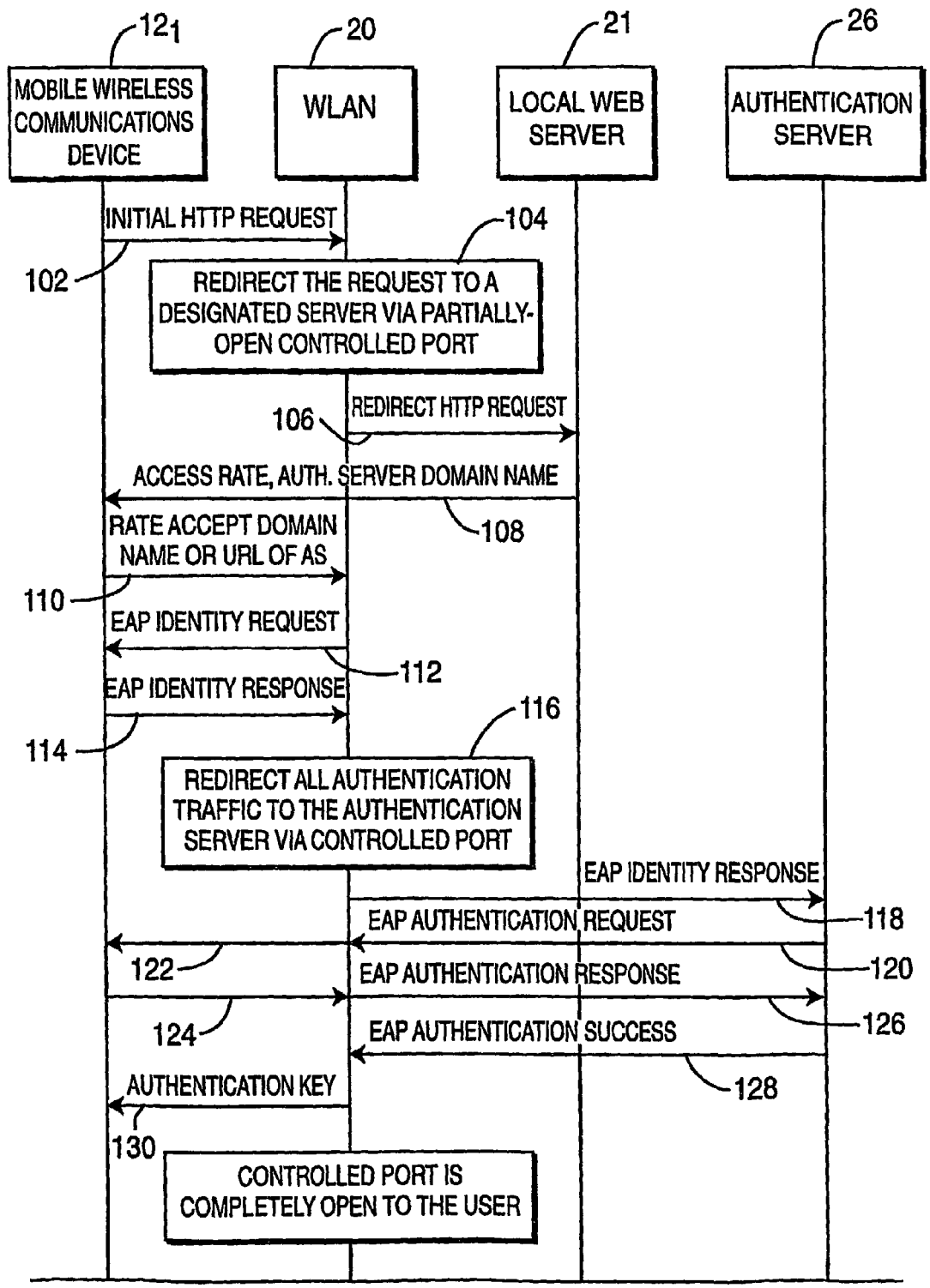
FIG. 2 depicts a timing chart depicting the sequence of events associated authenticating the user of the mobile wireless communications device in the communications system of FIG. 1.

FIG. 2 depicts the sequence of interactions that occurs over time among a mobile wireless communication device, say device $12_1$, the public wireless LAN 20, the local web server 21, and the authentication server 26 to achieve the desired secure access while permitting receipt of certain information without authentication. Referring to FIG. 2, prior to actually establishing an authenticated communications session, the user of the mobile wireless communications device $12_1$ can obtain non-authentication information by first launching an HTTP information request during step 102. The information request is initially received at one of the APs, such as AP $18_1$ of FIG. 1. When configured with the IEEE 802.1x protocol, the AP $18_1$ of FIG. 1 maintains a controlled port and an un-controlled port through which the AP exchanges information with the mobile wireless communications device $12_1$. The controlled port maintained by the AP $18_1$ serves as the entryway for non-authentication information to pass through the AP between the public wireless LAN 20 and the mobile wireless communications device $12_1$. Ordinarily, the AP $18_1$ keeps its controlled port closed in accordance with the IEEE 802.1x protocol until authentication of the mobile wireless communications device. The AP $18_1$ always maintains the uncontrolled port open to permit the mobile wireless communications device $12_1$ to exchange authentication data with an authentication server, e.g., server 26.

To permit the mobile wireless communications device $12_1$ to obtain non-authentication information, and particularly, access information, without authentication in accordance with the present principles, the public wireless LAN 20 causes each AP, such as AP $18_1$ of FIG. 1, to partially open its controlled access port after receiving a request for non-authentication information. Partially opening the controlled port in the AP $18_1$ enables receipt of such a non-authentication information request in the public wireless LAN 20 through the controlled port during step 104. Upon receipt of the information request, the public wireless LAN 20 redirects the request to the local web server 21 during step 106. Regardless of the destination specified in the information request initially made during step 102, the public wireless LAN 20 always directs the request to the web server 21 of FIG. 1 during step 106. The web server 21 responds to the information request by providing the requested information, (e.g., the access terms and conditions as well as the domain name of the authenticating server 26) to the requesting mobile wireless communications device $12_1$ during step 108. Assuming the user of the device finds the terms and condition are acceptable (or the user has negotiated acceptable terms and conditions), the mobile wireless communications device $12_1$ transmits to the AP $18_1$ an acceptance message during step 110. The acceptance message will identify the authentication server 26 by its name or URL. The mobile wireless device $12_1$ will automatically transmit such an acceptance message if the access terms and conditions communicated by the web sever 21 match predefined access criteria stored in the device. In absence of such a match, the user might need to trigger the transmission of an acceptance message.

Upon receiving the acceptance message, the AP $18_1$ requests the mobile wireless communications device $12_1$ to identify itself during step 112. Assuming the wireless communication device $12_1$ employs an Extensible Authentication Protocol (EAP) as is well known in the art, the AP $18_1$ will seek identification of the device through an EAP identity request. In response to the EAP identity request, the mobile wireless communications device $12_1$ sends an EAP identity response to the AP $18_1$ during step 114 for redirection and receipt at the authentication server 26 via the public wireless LAN 20 during step 116.

As part of the process of identifying the device, the public wireless LAN 20 typically checks whether the device user has a relationship with a billing agent serving the wireless LAN 20. If the user has a relationship, then the user need not do anything further as the billing agent will account for the access charges. In the absence of a relationship with a billing agent, the user will need to establish such a relationship. With the user's assent, the wireless LAN 20 can seek to dynamically establish such a relationship.

Upon receipt of the EAP identity response, the AP $18_1$ sends the EAP identity response to the authentication server 26 through the uncontrolled port during step 118. The authentication server 26 replies to the EAP identity response by directing an EAP authentication request to the AP $18_1$ during step 120 for subsequent transmission via the AP $18_1$ to the mobile wireless communications device $12_1$ during step 122. The mobile wireless communications device $12_1$ replies during step 124 with an EAP authentication response that is received through the uncontrolled port in the AP $18_1$. In turn, the AP $18_1$ forwards the EAP authentication response to the authentication server 26 during step 126.

Upon successful authentication of the mobile wireless communications device $12_1$, the authentication server 26 generates an EAP authentication success message during step 128 for receipt in the AP $18_1$. In turn, the AP $18_1$ sets an authentication key, typically a Wired Equivalent Privacy (WEP) encryption key, for transmission to the mobile wireless communications device $12_1$ during step 130. Lastly, the AP $18_1$ fully opens its controlled port to permit an exchange of traffic with the mobile wireless communications device $12_1$ through the controlled port.

The foregoing describes a technique for authenticating a mobile wireless communications device in a public wireless LAN that affords the user of the device the opportunity to receive non-authentication information in advance of actually establishing a communications session with the public wireless LAN.

The invention claimed is:

1. A communications network for authenticating a mobile wireless communications device, comprising:
   a first server for storing non-authentication information;
   a second server for authenticating the mobile wireless communications device;
   at least one access point having (a) controlled port via which the access point partially opens in response to a receipt of a request for non-authentication information from a mobile wireless communications device and for directing the non-authentication information request to the first server which sends a reply for receipt by the mobile wireless communications device, and (b) an uncontrolled port through which the access point directs authentication traffic received from the mobile wireless communications device to the second server which exchanges authentication traffic with the mobile wireless communications device; and
   a public wireless Local Area Network (LAN) coupled to the one AP and said first and second servers.

2. The system according to claim 1 wherein the AP utilizes a communication protocol in conformance with IEEE 802.1x.

3. The system according to claim 1 wherein the information stored in the first server includes access costs.

4. The system according to claim 1 wherein the second server authenticates the mobile wireless communications device in accordance with an Extensible Authentication Protocol (EAP).

5. The system according to claim 1 wherein the authentication traffic received at the one AP includes an identification of the authentication server.

6. An access point comprising:
   (a) controlled port being partially opened in response to a receipt of a request for non-authentication information from a mobile wireless communications device and for directing the non-authentication information request to a first server which sends a reply for receipt by the mobile wireless communications device, and
   (b) an uncontrolled port through which the access point directs authentication traffic received from the mobile wireless communications device to a second server, which exchanges authentication traffic with the mobile wireless communications device.

7. The system according to claim 6 wherein the access point utilizes a communication protocol in conformance with IEEE 802.1x.

* * * * *